(12) United States Patent
Salvador et al.

(10) Patent No.: US 9,258,518 B2
(45) Date of Patent: Feb. 9, 2016

(54) METHOD AND APPARATUS FOR PERFORMING SUPER-RESOLUTION

(71) Applicant: THOMSON LICENSING, Issy de Moulineaux (FR)

(72) Inventors: Jordi Salvador, Hamburg (DE); Axel Kochale, Springe (DE); Siegfried Schweidler, Gehrden (DE)

(73) Assignee: THOMSON LICENSING, Issy-les Moulineaux (FR)

( * ) Notice: Subject to any disclaimer, the term of this patent is extended or adjusted under 35 U.S.C. 154(b) by 0 days.

(21) Appl. No.: 14/382,454

(22) PCT Filed: Mar. 5, 2013

(86) PCT No.: PCT/EP2013/054447
§ 371 (c)(1),
(2) Date: Sep. 2, 2014

(87) PCT Pub. No.: WO2013/131929
PCT Pub. Date: Sep. 12, 2013

(65) Prior Publication Data
US 2015/0104116 A1    Apr. 16, 2015

(30) Foreign Application Priority Data
Mar. 5, 2012 (EP) .................... 12305265

(51) Int. Cl.
*G06K 9/32* (2006.01)
*H04N 7/01* (2006.01)
*G06T 3/40* (2006.01)

(52) U.S. Cl.
CPC ............ *H04N 7/0125* (2013.01); *G06T 3/4053* (2013.01); *H04N 7/0102* (2013.01); *H04N 7/0117* (2013.01)

(58) Field of Classification Search
CPC combination set(s) only.
See application file for complete search history.

(56) References Cited

FOREIGN PATENT DOCUMENTS

EP    2615579    7/2013

OTHER PUBLICATIONS

Brandi et al. "Super Resolution of Video Using Key Frames", Circuits and Systems, IEEE Int. Symposium ISCAS 2008, May 15, 2008, pp. 1608-1611, Piscataway, NJ, US.
Chaudhuri et al. "High-Resolution Slow-Motion Sequencing", IEEE Signal Processing Magazine, Mar. 1, 2005, pp. 16-24, vol. 22, No. 2, Piscataway, NJ, US.
Zhang et al. "Frame Rate Up-Conversion with Edge-Weighted Motion Estimation and Trilateral Interpolation", Circuits and Systems, 2009, ISCAS 2009, IEEE Int. Symposium on, May 24, 2009, pp. 1637-1640, Piscataway, NJ, US.
Haseyama et al "Spatio-temporal resolution enhancement of video sequence based in super-resolution reconstruction", ICASSP Mar. 14-19, 2010, pp. 870-873.

(Continued)

*Primary Examiner* — Duy M Dang
(74) *Attorney, Agent, or Firm* — Tutunjian & Bitetto, P.C.

(57) ABSTRACT

A method for performing super-resolution comprises steps of generating the high-resolution, low-frequency spatial and temporal bands of the input video sequence by interpolation, synthesizing the high-resolution, high-frequency spatial band by cross-frame spatial high-frequency extrapolation, and fusing these two bands to generate the spatio-temporally super-resolved video sequence. A corresponding system for performing super-resolution comprises a stage where the high-resolution, low-frequency spatial and temporal bands of the input video sequence is generated by interpolation, a stage where the high-resolution, high-frequency spatial band is synthesized by cross-frame spatial high-frequency extrapolation, and a stage where these two bands are fused to generate the spatio-temporally super-resolved video sequence.

14 Claims, 10 Drawing Sheets

(56) References Cited

OTHER PUBLICATIONS

Mudenagudi et al "On improving space-time super resolution using a small set of video inputs", Conference on Computer Vision and Image Processing, Dec. 16-19, 2008, pp. 320-327.
Shahar et al. "Space-Time Super-Resolution from a Single Video", IEEE Conference on Computer Vision and Patern Recognition, Jun. 21-23, 2011, pp. 1-8.
Takeda et al "Super-Resolution Without Explicit Subpixel Motion Estimation", IEEE Trans. on Image Processing vol. 19, No. 9 2009, pp. 1958-1097.
Search Report Dated July 25, 2013.

$f_{71}$ $f_{72}$ $f_{73}$ a)       b)

a)                                                b)

a)

b)

c)

d)

METHOD AND APPARATUS FOR PERFORMING SUPER-RESOLUTION

This application claims the benefit, under 35 U.S.C. §365 of International Application PCT/EP2013/054447, filed Mar. 5, 2013, which was published in accordance with PCT Article 21(2) on Sep. 12, 2013 in English and which claims the benefit of European patent application No. 12305265.6, filed Mar. 5, 2012.

FIELD OF THE INVENTION

This invention relates to a method and an apparatus for performing super-resolution (SR) in the temporal domain, or in the spatial and temporal domains.

BACKGROUND OF THE INVENTION

In "Space-Time Super-Resolution from a Single Video" by O. Shahar, A. Faktor and M. Irani (IEEE Conf. on Computer Vision and Pattern Recognition, 2011) [1], a space-time pyramid of the input video sequence is created containing several versions of the input video sequence at different spatial and temporal scales. Then, for each spatio-temporal video patch (with spatial dimensions of 5×5 pixels and temporal dimensions of 3 frames), a set of best matches is searched for across the pyramid. This operation is sped-up by means of a randomized-based search, which is highly costly. Then, classical reconstruction-based SR techniques are used to generate the super-resolved video patches, which, once put together, result in the super-resolved video sequence. Even though the method works impressively in the provided results, it is not clear that it would work properly in general sequences, with motions of different nature not recursively appearing at different spatial and temporal scales in the input video sequence. Furthermore, the spatio-temporal search, even if not exhaustive, is a costly procedure which renders the approach unusable for real-time applications.

In "On improving space-time super resolution using a small set of video inputs" by U. Mudenagudi, S. Banerjee and P. Kalra (Indian Conf. on Computer Vision, Graphics and Image Processing, 2008) [2], a method for generating a super-resolved version of a sequence for which several versions exist at various spatio-temporal shifts is presented, which uses graph-cuts to solve a MRF-MAP (Markov Random Field-Maximum A Posteriori) model of the classical reconstruction-based super-resolution equation. This method requires the existence of several versions of the same video sequence at different spatio-temporal shifts, which is something that does not occur in most of the available recorded material.

In "Spatio-temporal resolution enhancement of video sequence based in super-resolution reconstruction" by M. Haseyama, D. Izumi and M. Takizawa (ICASSP 2010) [3], a method for generating joint frame-rate up-conversion and up-scaling is presented, which is based on the classical reconstruction-based super-resolution model. Whereas the authors claim the proposed method is capable of obtaining temporal super-resolution, the equation describing such behavior indicates what is obtained is a smooth linear interpolation of the closest spatially super-resolved frames, which under general motion will produce incorrectly interpolated frames.

In "Super-Resolution Without Explicit Subpixel Motion Estimation" [4] by H. Takeda, P. Milanfar, M. Protter and M. Elad (IEEE Trans. on Image Processing, vol. 18, no. 9, 2009), spatio-temporal super-resolution of video sequences is achieved by using space-time steering filters in local regions, after having aligned matching patches by means of block matching. Two problems of this approach are that, first, the effect of the space-time steering filter is that of producing a non-linear over-smoothing of the region to be super-resolved, which requires a costly non-linear post-correction and loss of detail, and second that the approach is only capable of producing correctly interpolated frames under a limited subset of motion ranges, due to the mechanism for motion compensation (block matching).

SUMMARY OF THE INVENTION

The present invention relates to a novel method for the improvement of at least one of the resolution of each frame in a video sequence, and the frame-rate of the video sequence. The methodology uses parts of the method described in the co-pending European Patent application No. 12305046.0. As stated in that application, the super-resolution technique is flexible enough to be applied to signals of different dimensionality (given the condition that signals are correctly sampled, i.e. not showing severe aliasing artifacts). Innovative contributions of the present invention comprise, at least, a mechanism to cope with the severe temporal aliasing present in typical video sequences (e.g. 15 to 30 fps). In one embodiment, it is included in a general super-resolution framework from the aforementioned application. In the image processing literature, related methods fall in the categories of super-resolution and frame-rate up-conversion.

As a general idea, the video frames of an input sequence are initially stacked in a volumetric structure, with the two first dimensions representing vertical and horizontal axes in each frame and the third dimension representing time. Then, low-frequency spatio-temporal bands and spatial high-frequency bands of the super-resolved video sequence are generated separately. The low-frequency spatio-temporal bands of the super-resolved video sequence are generated by means of the Robust Iterative Block Matching method and analytical interpolation. In the next stage, the spatial high-frequency bands are synthesized by exploiting local spatio-temporal self-similarity in video sequences. Finally, the low-frequency spatio-temporal bands and spatial high-frequency bands are combined in order to generate the final super-resolved video sequence.

In one embodiment of the present invention, a method for performing super-resolution on a low-resolution input video sequence comprises steps of generating high-resolution, low-frequency (HRLF) spatial and temporal bands of the input video sequence by interpolation, synthesizing a high-resolution, high-frequency (HRHF) spatial band by cross-frame spatial high-frequency extrapolation, and fusing these bands to generate the spatio-temporally super-resolved video sequence.

In one embodiment of the present invention, a system for performing super-resolution on a low-resolution input video sequence comprises a stage where the high-resolution, low-frequency spatial and temporal bands (HRLF) of the input video sequence is generated by interpolation, a stage where the high-resolution, high-frequency spatial band (HRHF) is synthesized by cross-frame spatial high-frequency extrapolation, and a stage where the low-frequency spatial and temporal bands (HRLF) and the high-resolution, high-frequency spatial band are fused to generate the spatio-temporally super-resolved video sequence (HR).

The present invention also relates to a computer readable medium having executable instructions to cause a computer to perform a method as mentioned above and further described below.

One advantage of the proposed method is that it is capable of providing correct motion-compensation in a wide range of motions in a manner suited to the massively parallel hardware available in modern GPUs. The frame interpolation results achieved with such method can even rival with those of costly state-of-the-art methods for optical flow estimation. In other words, the method is capable of correctly interpolating the temporal axis in video sequences, thus effectively producing frame-rate up-conversion.

One advantage of the proposed method is that it is also capable of improving the spatial resolution of the input video sequence by means of the high-frequency extrapolation mechanism presented in the previously mentioned European Patent application No. 12305046.0. In the present invention, the mechanism for synthesizing the high-frequency bands of the output video sequence considers a broader search range extended to the 3D domain.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of the proposed system, in one embodiment.

DETAILED DESCRIPTION OF THE INVENTION

Figure 1:
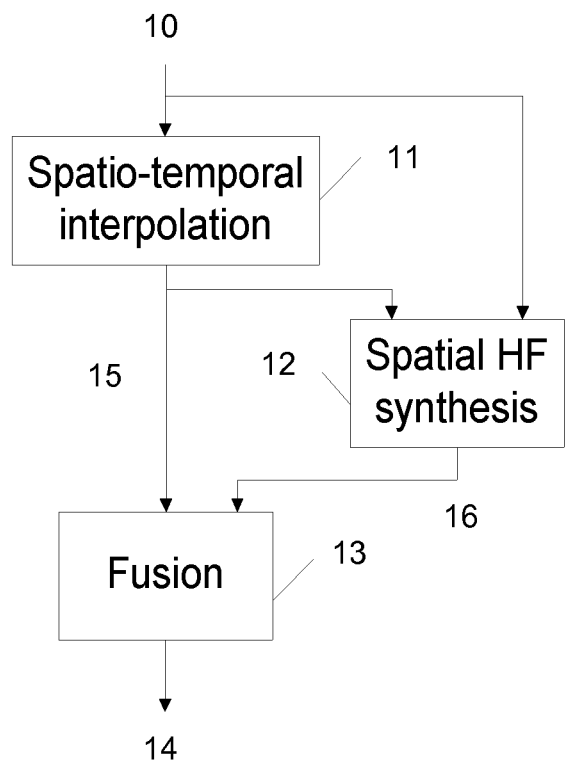

FIG. 1 shows the structure of the proposed system, in one embodiment. In FIG. 1, LR 10 is a low-resolution input video sequence, HRLF 15 is a high-resolution low-frequency interpolated band, HRHF 16 is a high-resolution high-spatial-frequency synthesized band and HR 17 is a resulting super-resolved video sequence, obtained after fusing the HRLF 15 and HRHF 16 bands. The high-resolution low-frequency HRLF interpolated band 15 is generated in spatio-temporal interpolation 11 that is applied to the low-resolution input video sequence 10. A spatial HF synthesis 12 is applied to the HRLF interpolated band 15, whereby also the original input sequence 10 is used. The spatial HF synthesis 12 produces a high-resolution high-spatial-frequency synthesized band 16. The HRLF interpolated band 15 and the HRHF synthesized band 16 are fused 13, which results in a super-resolved video sequence 14.

Figure 2:
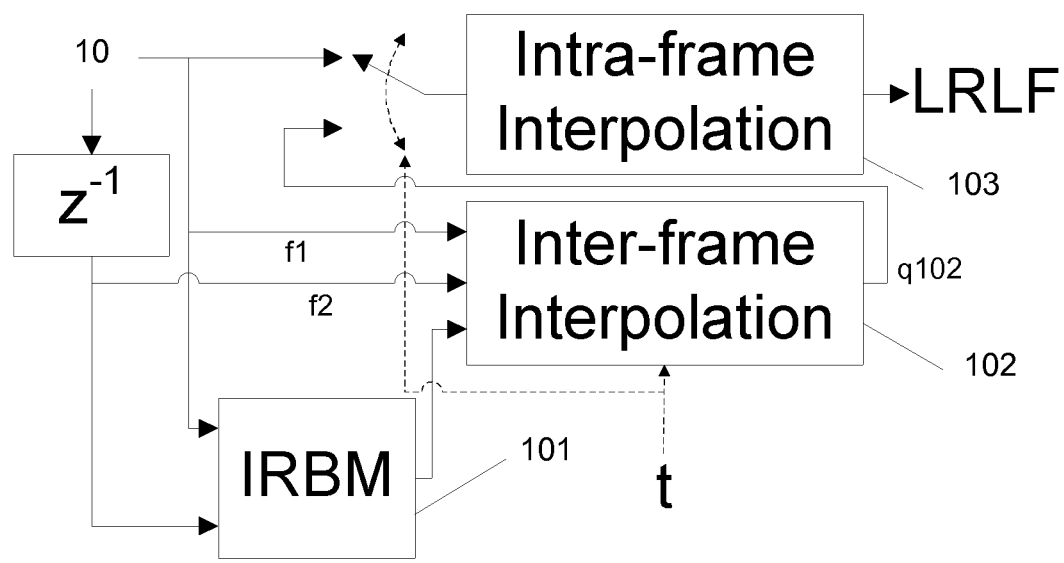
FIG. 2 the spatio-temporal interpolation subsystem, in one embodiment.

In the following, details of the Spatio-temporal interpolation 11 are described. The Spatio-temporal interpolation part of the system obtains the low-frequency band of the high-resolution output sequence (HRLF). Its block diagram is depicted in FIG. 2. A big challenge is the temporal interpolation of the video sequence. As a solution, a low-resolution current frame and its predecessor are used for generating the interpolated frame when the output time instant t is not integer. This is achieved by means of motion estimation (Iterative Robust Block Matching block, IRBM block) and inter-frame interpolation; otherwise, for integer output time instants, the high-resolution low-frequency band for a current time instant is obtained as an analytic interpolation of the current frame.

Next, the Iterative Robust Block Matching (IRBM) is described. Due to the high temporal aliasing in standard video sequences, analytic interpolation cannot be applied for interpolating the sequence between consecutive frames, for that would result in severe ghosting artifacts when there is high motion and contrast in the input video sequence. The present invention uses a block-matching algorithm, refined with the application of both a large-scale linear filter and a local-scale non-linear filter in an iterative fashion. It is referred to as Iterative Robust Block Matching (IRBM) herein. In one embodiment, IRBM is also used in the high-frequency synthesis stage, see below.

Figure 3:
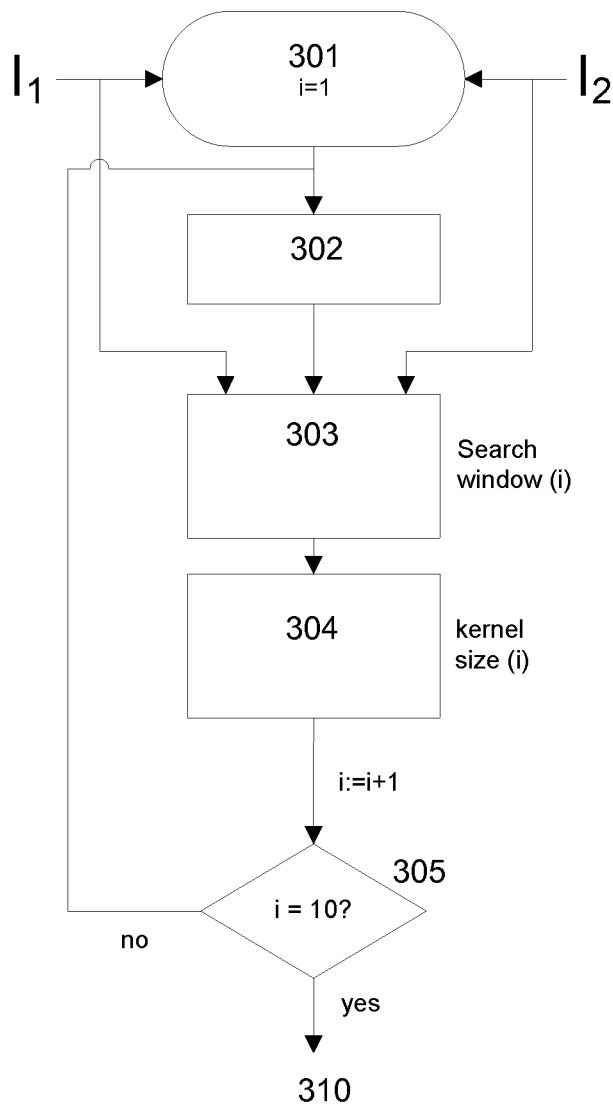
FIG. 3 a flow-chart of one embodiment of the Iterative Robust Block Matching.

FIG. 3 shows exemplarily a flow-chart of an Iterative Robust Block Matching process. Input to the IRBM are two consecutive video frames $I_1, I_2$, and the output is a dense set of motion vectors (i.e. a motion field, MF) 310 that connects each overlapping 5×5 patch in the first input image $I_1$ (past frame) with its estimated location in the second input image $I_2$ (future frame). Other patch sizes than 5×5 pixels can also be used, but 5×5 is particularly good for fast processing and high picture quality. The first step is to obtain an initial estimate of the motion field (MF) by applying Block Matching (BM) 301 on the images. Then, a certain number i (usually 5-15, e.g. 10 iterations) of iterative refinements 305 are applied to the motion field estimate. These consist in the cascaded application of Large-scale Linear Filtering 302, Guided Block Matching 303 with shrinking search window size, and Local-scale Non-linear Filtering 304.

The Block Matching 301 on the images is done with an initial search window, e.g. of size 41×41 pixels. The Large-scale Linear Filtering 302 averages motion vectors, e.g. with a kernel of size 81×81. The Guided Block Matching 303 uses shrinking search window size: the MF is used as offset for the search range, thus allowing for a reduced search window at each iteration. Exemplarily, in one embodiment the search window goes from 21×21 to 3×3 with exponential decay. The Local-scale Non-linear Filtering 304 uses a median filter with a linearly decreasing kernel size. In one embodiment, the kernel size ranges e.g. from 15×15 to 5×5.

At least some of the above-mentioned parameters, like the initial search window size of the Block Matching 301, the search window size of the Guided Block Matching 303 and the kernel size of the median filter for Local-scale Non-linear Filtering 304 may vary, at least with the patch size; for example, one or more of the values may be higher for larger patches, and/or for images larger than CIF.

One effect of the first, linear filter in Large-scale Linear Filtering 302 is that it introduces smoothness in the estimation of the motion field. One effect of the second, non-linear filter in Local-scale Non-linear Filtering 304 is that it introduces local constancy while preserving edges, or, in practice, it introduces robustness to noise. The iterative cascaded application of a smoothing filter with an averaging effect (in Large-scale Linear Filtering 302), Guided Block Matching 303 and a robust filter (such as a median filter) with decreasing window sizes in Local-scale Non-linear Filtering 304 provides a smooth and robust approximation of the actual motion field 310.

In order to use the data from both available views (i.e. frames) for interpolating the new view (i.e. frame), the IRBM takes the second image $I_2$ as reference for a current image $I_1$. In this way, a dense motion field that relates each image to its predecessor/successor is obtained.

Next, the Inter-frame Interpolation 102 shown in FIG. 2 is described. Given two images and their corresponding motion fields relating them to each other, the output of the Inter-frame Interpolation 102 is an interpolated frame q102 that lacks high-frequency temporal information and that is at a normalized temporal position $\tau$ between 0 and 1 (with 0 corresponding to the first image and 1 to the second image).

Figure 4:
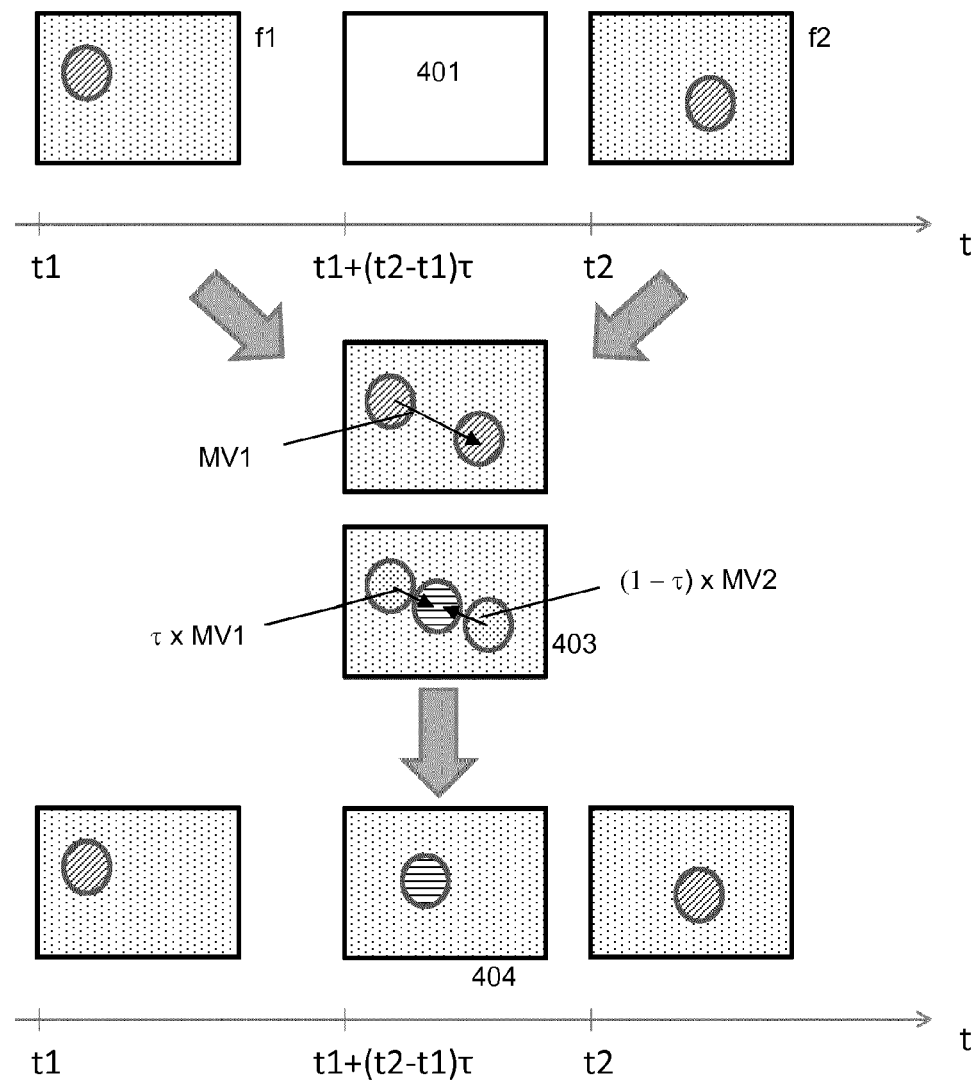
FIG. 4 how in principle a new frame is created at a desired normalized temporal position τ.

An Inter-frame Interpolation 102 process is illustrated in FIG. 4. Initially in the Inter-frame Interpolation 102, an output image is initialized 401, e.g. to zero. Then, a first of the two input images fr1,fr2 from the input video sequence 10 is divided into overlapping patches, e.g. of size 5×5. For each of these patches, its position in the time-interpolated image is computed by linear interpolation, i.e. as a translation with respect to its position (i.e. a shift) in the input image by $\rho$ multiplied with the motion vector at its center MV1, according to $\tau \times MV1$. Then, the translated (i.e. shifted) patch is accumulated in an intermediate output image 403 with a weighting factor of $1-\tau$. That is, the closer to the first frame fr1 the temporal position of the new frame is, the higher is the weighing factor for the patch from the first frame fr1. A weighting factor accumulation buffer $B_{w,acc}$, which is initialized to 0, accumulates the weighting factors applied to each pixel in the output image.

The second image fr2 is processed in the same manner, except that the value of the translation magnitude is changed to $1-\tau$ and the weighting factor to $\tau$. That is, the closer to the second frame fr2 the temporal position of the new frame is, the higher is the weighing factor for the patch from the second frame fr2.

Once all the patches of both images fr1,fr2 have been processed, the accumulated intermediate output image 403 is normalized by the accumulated weighting factor retrieved in the weighting factor accumulation buffer $B_{w,acc}$, resulting in the temporally-interpolated frame 404.

In FIG. 4, a new frame is created at a desired normalized temporal position $\tau$ by combining its two closest images. The motion fields in both directions have been previously obtained by IRBM. A first motion vector MV1 is obtained from the shown frames fr1,fr2 at times $t_1$ and $t_2$. In the embodiment described above, the same motion vector MV1 is used for contributions from both frames fr1,fr2. In another embodiment, a second motion vector MV2 is used for the interpolation, which is obtained from frame fr2 at time $t_2$ and its next following frame at time $t_3$ (not shown).

In one embodiment, a temporally interpolated frame of the low-frequency spatial and temporal bands is obtained by generating a motion field between at least two input frames fr1,fr2, initializing 401 an output image buffer, determining a temporal position $\tau$ of the output image, dividing each of the two input frames fr1,fr2 into overlapping patches, and for both input frames fr1,fr2 performing the following steps:

For each of the patches, calculating its spatial position in the output image by linear interpolation of the motion vector according to the determined temporal position, for each of the patches, calculating a weighting factor according to the determined temporal position $(1-\tau)$ and multiplying pixel values of a current patch with the weighing factor, wherein weighted pixel values of each patch are obtained, accumulating in the output image buffer the weighted pixel values of the patches at the calculated spatial positions of the respective patches, wherein each patch contributes weighted values of its pixels to pixels of the output image at the calculated position, then accumulating, in a weighting factor accumulation buffer, the weighting factors that contribute to each pixel of the output image, wherein an accumulated weighting factor is obtained for each pixel, and when all the patches of both images fr1,fr2 have been processed, normalizing the accumulated intermediate output image 403 by the accumulated weighting factor that is contained in the weighting factor accumulation buffer and can be retrieved thereof.

Next, the Intra-frame Interpolation 103 shown in FIG. 2 is described. This module is equivalent to the generation of an up-scaled low-frequency band of an image by any desired rational up-scaling factor, as described in the previously mentioned European Patent application No. 12305046.0 and summarized in the following. The Intra-frame Interpolation 103 is used to obtain the HRHF portions of those HR frames for which temporally coincident LR input frames are available. Thus, the Intra-frame Interpolation 103 works only in the spatial domain.

Figure 14:
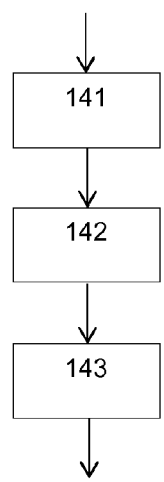
FIG. 14 the principal structure of Intra-frame Interpolation.

The principle structure of the Intra-frame Interpolation 103 is shown in FIG. 14. More details are described below and shown in FIG. 9. According to this part of the invention, super-resolving a single image comprises three stages 141-143. In the first stage 141, an interpolation-based up-scaling of the input image is performed, followed by an equivalent low-pass filtering operation on the low-resolution image. The second stage 142 comprises a search for low-frequency matches between an inspected patch in the high-resolution image and patches in a local neighborhood in the low-resolution low-frequency image (including partly overlapping patches), and accumulating the corresponding high-frequency contribution obtained from the low-resolution image. The third stage 143 comprises adding the contributions of the low-frequency band of the high-resolution image and the extrapolated high-frequency band.

In one embodiment, a method for generating a super-resolution version of a single low resolution digital input data structure $S_0$, according to one aspect of the present invention, comprises steps of upscaling and subsequent low-pass filtering the single low resolution digital input data structure $S_0$ to obtain a low-frequency portion $L_1$ of an upscaled high resolution data structure. Further, the low resolution digital input data structure $S_0$ is separated into a low-frequency portion $L_0$ and a high-frequency portion $H_0$. A high-frequency portion $H_{1,init}$ of the upscaled high resolution data structure is created, which is initially empty. Then, for each of a plurality of patches of the low-frequency portion $L_1$ of the upscaled high resolution data structure, a best matching block in the low-frequency portion $L_0$ of the low resolution digital input data structure is searched, and its corresponding block in the high-frequency portion $H_0$ of the low resolution digital input data structure is determined. The determined block from the high-frequency portion $H_0$ of the low resolution digital input data structure is then added to the high-frequency portion $H_{1,acc}$ of the upscaled high resolution data structure, at the position that the above-mentioned patch in the low-frequency portion $L_1$ of the upscaled high resolution data structure has. Finally, the resulting high-frequency portion $H_{1,acc}$ of the upscaled high resolution data structure is normalized and, in one embodiment, high-pass filtered 195. The normalized, high-pass filtered high-frequency portion $H_1$ of the upscaled high resolution data structure is added to the low-frequency portion $L_1$ of the upscaled high resolution data structure, which results in an improved super-resolution version $S_1$ of the single low resolution digital input data structure $S_0$. The digital input data structure $S_0$ can be 1-dimensional (1D), 2-dimensional (2D) or 3-dimensional (3D). In an embodiment of the present invention, it is 3D with two spatial dimensions and one temporal dimension.

For better readability, the term "block" is used in the following for a group of adjacent values in a low resolution data structure, while the term "patch" is used for a group of adjacent values in a high resolution data structure. However, a block and a patch have the same size (i.e. number and shape of adjacent values) and are substantially the same.

Figure 15:
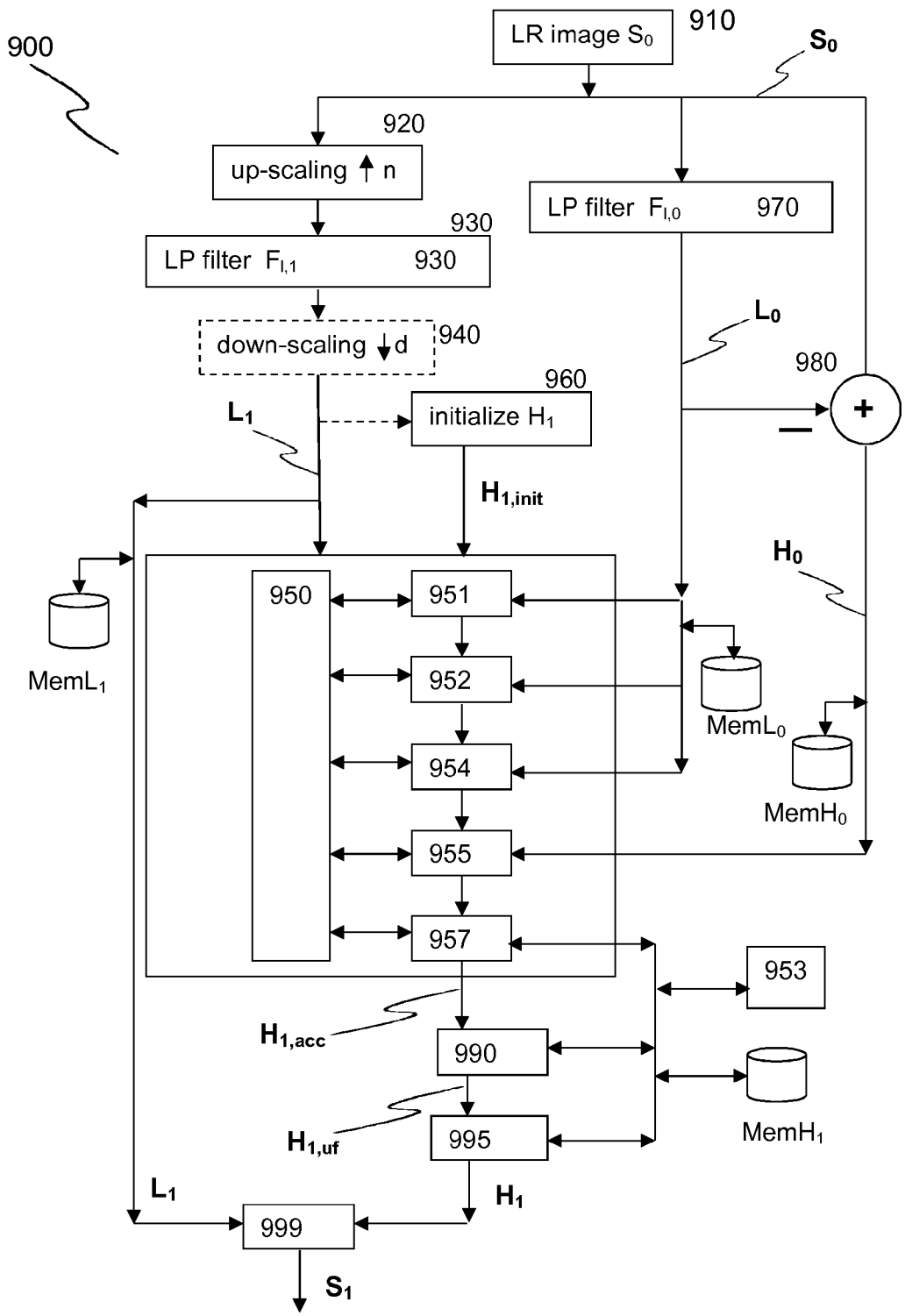
FIG. 15 a structure of an apparatus for performing super-resolution processing of a low resolution input data structure.

In one embodiment of the invention, the Intra-frame Interpolation 103 is performed by an apparatus for performing super-resolution processing of a low resolution input data structure $S_0$ of digital data, with a structure as shown in FIG. 15. Such apparatus 900 for performing super-resolution processing of a low resolution input data structure $S_0$ of digital data comprises a first low-pass filter $F_{l,0}$ 970 for filtering the input data structure $S_0$, wherein a low-frequency input data structure $L_0$ is obtained, a subtraction unit (e.g. adder, subtractor, comparator or differentiator) 980 for calculating a difference between the input data structure $S_0$ and the low-frequency input data structure $L_0$, whereby a high-frequency input data structure $H_0$ is generated, an upscaler 920 for upscaling the input data structure $S_0$, a second low-pass filter $F_{l,1}$ 930 for filtering the upscaled input data structure, wherein a low-frequency upscaled data structure $L_1$ is obtained, a first determining unit 951 for determining in the low-frequency upscaled data structure $L_1$ a first patch at a first position, a search unit 952 for searching in the low-frequency input data structure $L_0$ a first block that matches the first patch best, and a second determining unit 954 for determining the position of said first block within the low-frequency input data structure $L_0$, a selector 955 for selecting a second block in the high-frequency input data structure $H_0$ at the determined position, an accumulator 957 for accumulating pixel data of the selected second block to a second patch, the second patch being a patch in a high-frequency upscaled data structure at the first position, a control unit 950 for controlling repetition of the processing for a plurality of patches in the low-frequency upscaled data structures $L_1$ and $H_{1,acc}$, a normalizing unit 990 for normalizing the accumulated pixel values in the high-frequency upscaled data structure, whereby a normalized high-frequency upscaled data structure $H_{1,uf}$ is obtained, a high-pass filter 995 for filtering the normalized high-frequency upscaled data structure $H_{1,uf}$, and a combining unit 999 for combining (e.g. adding) the HP-filtered, normalized high-frequency upscaled data structure $H_1$ with the low-frequency upscaled data structure $L_1$, whereby a super-resolved data structure $S_1$ is obtained. When the apparatus 900 for performing super-resolution processing is used in the Intra-frame Interpolation 103 unit, the super-resolved data structure $S_1$ is the LRLF shown in FIG. 2. More details on the filter 995 are provided below.

One advantage of at least this embodiment of the invention is that, due to the employed self-averaging, less noise is introduced in the upscaled data structure than with conventional methods. A further advantage of this embodiment of the Intra-frame Interpolation 103 is that it works with a single-image, but advantageously does not require a database, code book or similar, and not any training or training data; conventional single-image methods require a data-base for trained retrieving of high-frequency examples.

Figure 9:
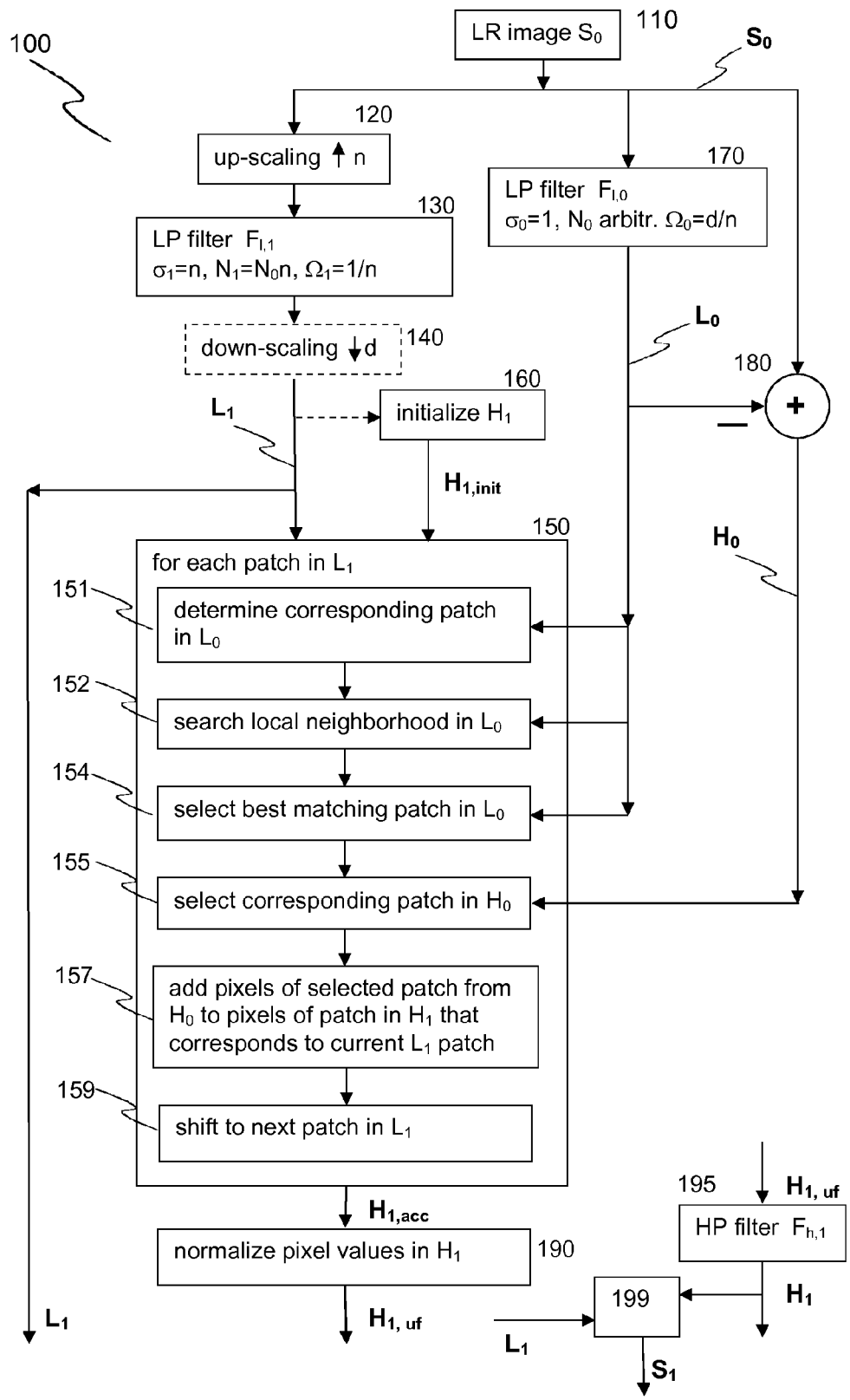
FIG. 9 a flow-chart of one embodiment of a method for performing spatial super-resolution processing.

FIG. 9 shows, in an embodiment of the present invention, a flow-chart of a method for performing super-resolution processing of a low resolution input data structure $S_0$ of digital 1D, 2D or 3D data. In this embodiment, the method comprises steps of filtering 170 the input data structure $S_0$ by a first low-pass filter $F_{l,0}$, wherein a low-frequency input data structure $L_0$ is obtained, calculating in an adder/subtractor 180 a difference between the input data structure $S_0$ and the low-frequency input data structure $L_0$, whereby a high-frequency input data structure $H_0$ is generated, upscaling 120 the input data structure $S_0$, and filtering 130 the upscaled input data structure by a second low-pass filter $F_{l,1}$, wherein a low-frequency upscaled data structure $L_1$ is obtained, determining in the low-frequency upscaled data structure $L_1$ a first patch $P_{n,L1}$ at a first position, searching 151,152,154 in the low-frequency input data structure $L_0$ a first block $B_{n,L0}$ that matches the first patch $P_{n,L1}$ best, and determining the position of said first block $B_{n,L0}$ within the low-frequency input data structure $L_0$, selecting 155 a second block $B_{n,H0}$ in the high-frequency input data structure $H_0$ at the determined position, accumulating 157 data values (e.g. pixel data) of the selected second block $B_{n,H0}$ to a second patch $P_{n,H1}$, the second patch being a patch in a high-frequency upscaled data structure $H_{1,acc}$ at the first position (that was determined above for the first patch $P_{n,L1}$), repeating 150 the steps of determining a new patch $P_{n,L1}$ in the low-frequency upscaled data structure $L_1$, searching 151,152,154 in the low-frequency input data structure $L_0$ a block $B_{n,L0}$ that matches the selected patch $P_{n,L1}$ best, selecting 155 a corresponding block $B_{n,H0}$ in the high-frequency input data structure $H_0$ and accumulating 157 pixel data of the selected corresponding block $B_{n,H0}$ to a patch $P_{n,H1}$ in the high-frequency upscaled data structure $H_{1,acc}$ at the position of said new patch $P_{n,L1}$, and normalizing 190 and HP-filtering 195 the accumulated pixel values in the high-frequency upscaled data structure $H_{1,acc}$, whereby a normalized high-frequency upscaled data structure $H_1$ is obtained. Finally, a super-resolved data structure $S_1$ is obtained by adding the normalized high-frequency upscaled data structure $H_1$ to the low-frequency upscaled data structure $L_1$.

In some embodiments, the upscaled input data structure after filtering 130 by the second low-pass filter $F_{l,1}$ is downscaled 140 by a downscaling factor d, with n>d. Thus, a total non-integer upscaling factor n/d is obtained for the low-frequency upscaled data structure $L_1$. The high-frequency upscaled data structure $H_{1,init}$ (or $H_1$ respectively) has the same size as the low-frequency upscaled data structure $L_1$. The size of $H_1$ may be pre-defined, or derived from $L_1$. $H_1$ is initialized in an initialization step 160 to an empty data structure $H_{1,init}$ of this size. In such embodiments, the low-frequency upscaled data structure $L_1$ is obtained by upscaling 120 the input data structure $S_0$ by an upscaling factor n, filtering 130 the upscaled input data structure by said second low-pass filter $F_{l,1}$ and downscaling 140 the filtered upscaled input data structure in a downscaling unit 940 by a downscaling factor d, with n>d. Thus, a final non-integer upscaling factor n/d is obtained.

Figure 10:
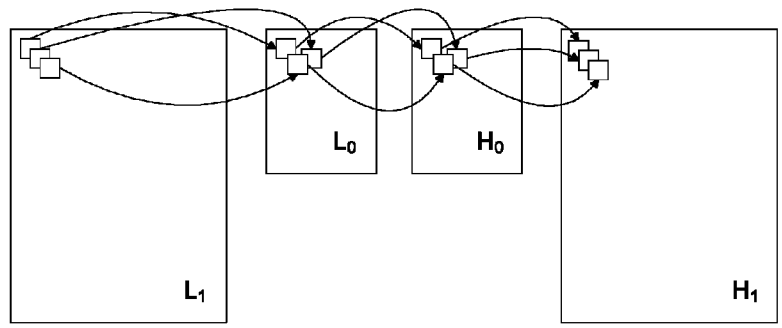
FIG. 10 synthesis of the high-frequency band of the super-resolved image by extrapolation of the high-frequency information of similar patches at the original resolution scale.

FIG. 10 shows the principle of the synthesis of the high-frequency band $H_1$ of a super-resolved (i.e. high resolution) image. It is achieved by extrapolation of the high-frequency information of similar patches at the original resolution scale $H_0$. Note that, if in the following description the high-frequency high-resolution data structure $H_1$ is mentioned, actually the unfiltered, non-normalized high-frequency high-resolution data structure $H_{1,acc}$ is meant.

The low-frequency band of the high-resolution image $L_1$ is first divided into small patches $P_{n,L1}$ (e.g. 5×5 pixels) with a certain overlap. The choice of the amount of overlap trades-off robustness to high-frequency artifacts (in the case of more overlap) and computation speed (in the case of less overlap). In one embodiment, an overlap of 20-30% in a each direction is selected, i.e. for adjacent patches with e.g. 5 values, 2 values overlap. In other embodiments, the overlap is higher, e.g. 30-40%, 40-50%, around 50% (e.g. 45-55%) or up to 90%. For an overlap below 20% of the patch size, the below-described effect of the invention is usually lower.

The final high-frequency band $H_1$ is obtained after normalizing by the number of patches contributing to each pixel, thus resulting in an average value. The larger the overlap between patches is, the better is the suppression of high-frequency artifacts resulting from the high-frequency extrapolation process, and the more values are accumulated. Then, for each low-frequency high-resolution patch $P_{n,L1}$, a best match in terms of mean absolute difference (MAD, known from motion estimation) is obtained after an exhaustive search in a local search window (e.g. 11×11 pixels) over the low-frequency band $L_0$ of the low-resolution image. The best match is a block $P_{n,L0}$ from the low-frequency high-resolution image $L_0$ that has the same size as the low-frequency high-resolution patch $P_{n,L1}$ (e.g.5×5 pixels).

For understanding the next step, it is important to note that the low-resolution low-frequency data structure $L_0$ has the same dimension as the low-resolution high-frequency data structure $H_0$, and the high-resolution low-frequency data structure $L_1$ has the same dimension as the high-resolution high-frequency data structure $H_1$, as shown in FIG. 10. For every patch, the position of the matched low-frequency low-resolution patch $P_{n,L0}$ (within $L_0$) is determined, and the corresponding low-resolution high-frequency patch $P_{n,H0}$ (within $H_0$) at the position of the matched low-frequency low-resolution patch $P_{n,L0}$ is extracted. The extracted low-resolution high-frequency patch $P_{n,H0}$ from $H_0$ is then accumulated on the high-frequency band of the high-resolution image $H_1$, at the same position that the current patch $P_{n,L1}$ in the high-resolution low-frequency data structure $L_1$ has. In detail, each value (e.g. pixel) of the extracted low-resolution high-frequency patch $P_{n,H0}$ from $H_0$ is accumulated on the corresponding value (e.g. pixel) in the respective patch of the high-frequency band of the high-resolution image $H_1$. In this way, the high-frequency band of the high-resolution image $H_1$ is synthesized by patch-wise accumulation. The process of dividing the low-frequency band of the high-resolution image $L_1$ in overlapping patches, finding the best low-frequency match and accumulating the corresponding high-frequency contribution is illustrated in FIG. 11, and is described below.

As a result, each value in the resulting (preliminary) high-frequency band of the high-resolution data structure $H_1$ is a sum of values from a plurality of contributing patches. Due to the patch overlap in $L_1$ (and consequently also in $H_1$ since both have the same dimension), values from at least two patches contribute to many or all values in $H_1$. Therefore, the resulting (preliminary) high-frequency band of the high-resolution data structure $H_1$ is normalized 190. For this purpose, the number of contributing values from $H_0$ for each value in the high-frequency high resolution data structure $H_1$ is counted during the synthesis process, and each accumulated value in $H_{1,acc}$ is eventually divided by the number of contributions.

Figure 11:
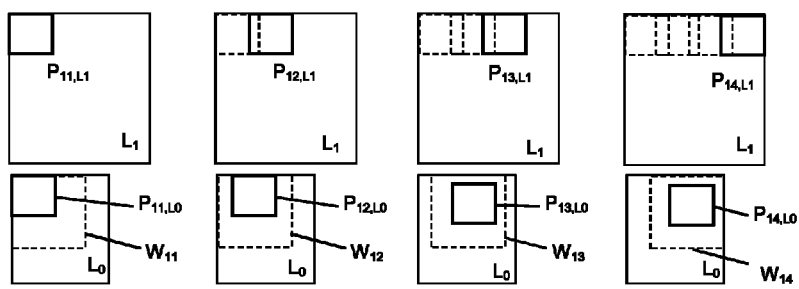
FIG. 11 exemplary usage and positions of a search window.
Figure 11:
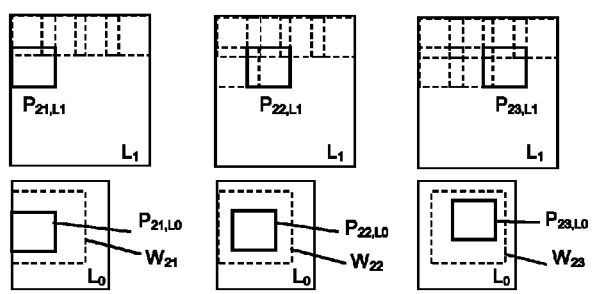

FIG. 11 shows, exemplarily, usage and positioning of a search window within the low-resolution low-frequency data structure $L_0$. For a first patch $P_{11,L1}$ in $L_1$, a first best matching block $P_{11,L0}$ is searched in $L_0$ within a first search window $W_{11}$. Both patches have the same size. The search window is larger than the patch by at least one value in each direction (except on edges, as for the first patch). In this example, the first best matching block $P_{11,L0}$ is found in $L_0$ in the upper left corner of the first search window $W_{11}$. The further process for this patch and block is as described above. Then, subsequent patches are shifted horizontally and/or vertically, wherein each patch overlaps a previous patch. In the present invention, the search is extended to one or more neighboring frames. In one embodiment, a direct neighbor is searched, i.e. a frame range of ±1 frame is used. In one embodiment, at least one of a direct neighbor and a direct neighbor's direct neighbor is searched, i.e. a frame range of ±1 frame or ±2 frames is used.

In the example shown in FIG. 11, a second patch $P_{12,L1}$ is selected at a position that is shifted horizontally by a given patch advance. Patch advance is the difference between patch size and overlap. Patch advances in different dimensions (e.g. horizontal and vertical for 2D data structures) may differ, which may lead to different effects or qualities in the dimensions of the high-resolution output data structure, but they are usually equal.

A new search window $W_{12}$ is determined according to the new patch position. In principle, the search windows advance in the same direction as the patch, but slower. Thus, a current search window may be at the same position as a previous search window, as is the case here. However, since another patch $P_{12,L1}$ is searched in the search window, the position of the best matching patch $P_{12,L0}$ will usually be different. The best matching patch $P_{12,L0}$ is then accumulated to the high-resolution high-frequency data structure $H_1$ at the position of the low-frequency high-resolution patch $P_{12,L1}$, as described above. Subsequent patches $P_{13,L1}, P_{14,L1}$ are determined and their best matches are searched in the same way. As shown in FIG. 11, the position of the best matching block within the search window is arbitrary and depends on the input data (e.g. the image content).

The above description is sufficient for a 1-dimensional (1D) data structure. For 2D data structures, the position of a further subsequent patch is found by vertical patch advance. Vertical patch advance may or may not be combined with a horizontal patch advance. Also vertical patch advance includes an overlap, as mentioned above and shown in FIG. 11 for $P_{21,L1}, \ldots, P_{23,L1}$.

The position of the search window is determined according to the position of the current patch. As shown in FIG. 11, the search windows $W_{11}, \ldots, W_{22}$ of different patches overlap. Since $L_0$ is a smaller data structure than $L_1$, the search window advance in each dimension is very small. In one embodiment, the search windows are on the edge of $L_0$ if their corresponding patch is on an edge of $L_1$, and it is uniformly and/or proportionally moved in between these edges.

In one embodiment (not shown in FIG. 11), the center of the search window is set at a position that is substantially proportional to the center of the patch. E.g. where the center of a patch is at 3% of the high-resolution data structure $L_1$, the center of the search window is set to be at approximately 3% (rounded) of the low-resolution data structure $L_0$. In this case, for patches near an edge, the search window size may be reduced, or the search window may be shifted completely into the low-resolution data structure $L_0$.

In general, the larger the search window, the more likely it is to find a very similar patch. However, in practice little difference in accuracy is to be expected by largely increasing the search window, since the local patch structure is more likely to be found only in a very local region in general natural images. Moreover, a larger search window requires more processing during the search.

Figure 12:
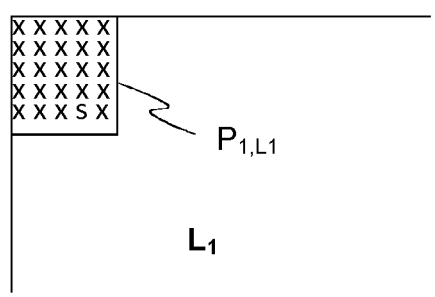
FIGS. 12a-d show the details of a selection of successive patches in a 2D input data structure, including overlap, and the principle of determining a matching block for successive patches.
Figure 12:
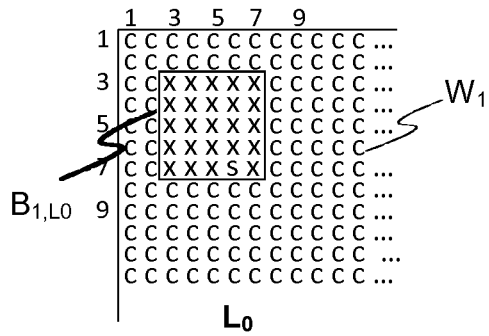
Figure 12:
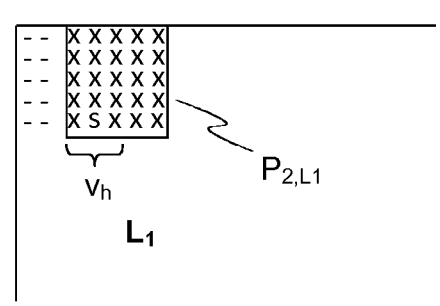
Figure 12:
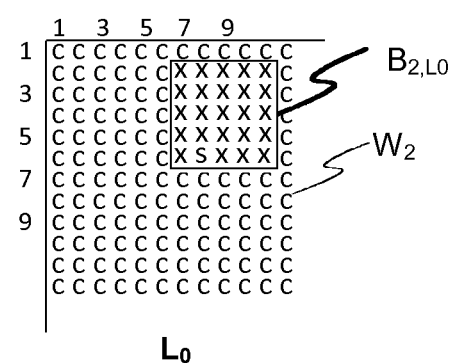
Figure 12:
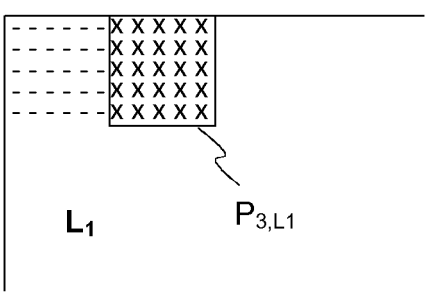
Figure 12:
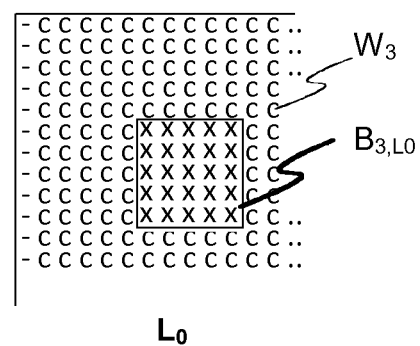
Figure 12:
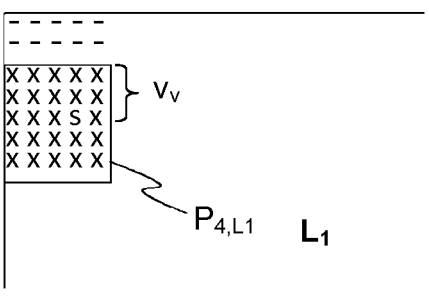
Figure 12:
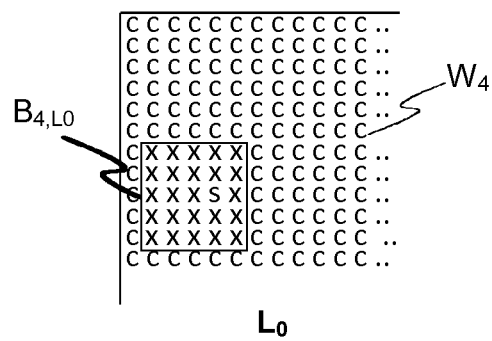

FIG. 12 shows details of the selection of successive patches in an image (i.e. a 2D input data structure), overlap and the principle of determining matching blocks for successive patches. Exemplarily, patches and blocks have 5×5 pixels and search windows have 12×12 pixels. For a first patch $P_{1,L1}$ in $L_1$, a search window $W_1$ is determined in $L_0$ or a neighboring LF frame, as described above. Within the search window $W_1$, comparison of the first patch at different block positions is performed, and a block $B_{1,L0}$ is determined that has the least mean absolute difference (MAD). This is the best matching block. Its position within the low-resolution low-frequency data structure $L_0$ is determined, e.g. its upper left corner being in the third column and third row. Then a corresponding patch at the same position in the corresponding high-frequency low-resolution image $H_0$ (i.e. it may be a neighbor) is determined. Thus, it is a 5×5 pixel patch with its upper left corner being in the third column and third row. This patch is extracted from $H_0$ and added to $H_1$ at the position of the current low-frequency high-resolution patch $P_{1,L1}$, i.e. at the upper left corner of $H_1$ (see FIG. 12a).

The second patch $P_{2,L1}$ is selected according to the employed patch advance, as shown in FIG. 12b). The patch advance is in this case two pixels in both dimensions, which means that due to the patch size of 5×5 pixels, the overlap is three. Thus, in this example, vertical overlap $v_v$ and horizontal overlap $v_h$ are equal. Due to the slower search window advance, the search window $W_2$ is the same as for the previous patch. However, due to different pixel values (according to arbitrary image content), another best matching block $B_{2,L0}$ within the search window is found. In the same manner as described above, its position is determined (e.g. upper left corner in the $7^{th}$ column, $2^{nd}$ row), the corresponding 5×5 block (with upper left corner in the $7^{th}$ column, $2^{nd}$ row) is extracted from $H_0$, and the extracted block from $H_0$ is added to the high-frequency high-resolution image $H_1$ at the position of the second patch $P_{2,L1}$, i.e. with its upper left corner at the first row, third column. Thus, a particular pixel that belongs to two or more different patches, is accumulated from corresponding pixels of to the best matching blocks. I.e., exemplarily, a particular pixel s in the $4^{th}$ column, $5^{th}$ row of the high-resolution high-frequency image $H_1$ (corresponding to the position in $L_1$ shown in FIG. 12) has, at the current stage of the process as described, a value that is accumulated from a pixel at the $6^{th}$ column, $7^{th}$ row (from the best-matching block $B_{1,L0}$ of the first patch) and from a pixel at the $8^{th}$ column, $6^{th}$ row (from the best-matching block $B_{2,L0}$ of the second patch).

As mentioned above, the search window advances usually only after a plurality of patches have been processed. As shown exemplarily in FIG. 12c) for the above-described configuration, it takes three patch advances (i.e. the $4^{th}$ patch) before the search window $W_3$ is shifted by one pixel in horizontal direction. Further, it is noted here that the sequential order of various dimensions of the patch advance (and thus search window advance) makes no difference. Thus, the patch depicted in FIG. 12d) may be processed after previous patches have shifted until the right-hand edge of $L_1$, but it may also be processed directly after the first patch as shown in FIG. 12a).

In the following, Spatial HF synthesis 12 is described (see FIG. 1). At the input of the Spatial HF synthesis there are a number of frame-rate up-converted and up-scaled input video frames (conforming the HRLF band), which are stacked in a volumetric structure. Two of the axis correspond to the spatial image dimensions and the third one to the temporal dimension.

In one embodiment, a method for Spatial HF synthesis is employed that closely resembles the one described above in the section about Inter-Frame Interpolation 102. The difference is that, in this embodiment, the HF example can be taken from any of the images in a local neighborhood of the patch for which the high-frequency band should be obtained. In other words, the search window is a 3D volume centered at each patch.

Although the technique can be applied to also recover temporal high-frequencies (by considering 3D patches instead of 2D patches), a high amount of aliasing in the temporal aliasing may occur, which may introduce visible ghosting effects. Thus, a more effective approach would be desirable. To solve this problem, in one embodiment of the invention, super-resolving (i.e., synthesizing the high-frequency band) is done just in the spatial dimensions, but not in the temporal dimension. An advantage of this embodiment is that the high-frequency components required to generate the high-resolution versions of the interpolated frames can also be obtained by exploring the low-resolution neighboring frames.

Figure 13:
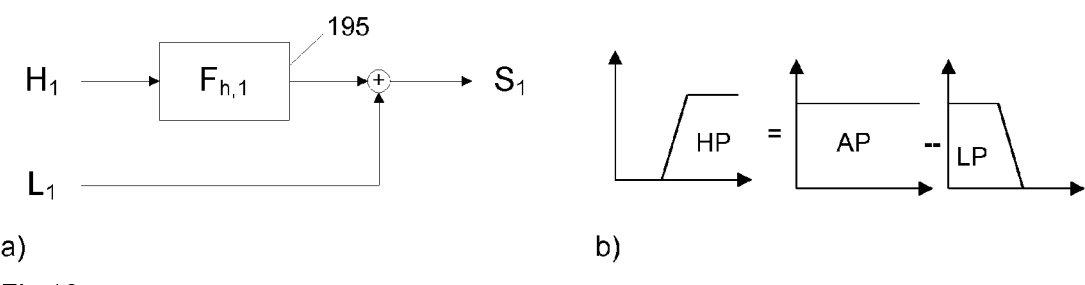
FIGS. 13a and 13b shows a block diagram and graphical representation of the fusion of the interpolated low-frequency band L1 and the extrapolated high-frequency band H1 for generating the super-resolved image S1.

Next, the Fusing 13 of the HRLF interpolated band 15 and the HRHF synthesized band 16 is described. This fusing 13 which is performed in a fusion unit results in a super-resolved video sequence 14. In one embodiment, a high-pass filter 995 is applied to the spatial dimensions in this part, to ensure the spectral compatibility of the synthesized HRHF band with the interpolated HRLF band. FIG. 13 a) shows exemplarily the fusion of a HRLF (high-resolution low-frequency) band $L_1$ and the normalized high-frequency high-resolution (HRHF) band $H_1$ for generating a super-resolved image $S_1$. The normalized high-frequency band $H_1$ is filtered using a high-pass filter 995, in order to ensure spectral compatibility with the low-frequency band. This high-resolution high-pass filter 995 is described in the following. The filter $F_{h,1}$ 995 is used in the filtering step 195 mentioned above, and is preferably designed in the same fashion as the filters $F_{l,0}, F_{l,1}$ 930,970 in the first stage 11. In this case, the goal is to obtain a high-pass filter with a cut-off frequency $\Omega_{1,h} = d/\max(n, d) = d/n$. Its order is set to a scaled version of the low-resolution filter order: $N_{1,h} = \text{round}(N_0 n/d)$, and its magnitude $\sigma_{1,h} = 1$. The final coefficients of the separable high-pass filter are set to a Kronecker delta aligned with the center of the Hamming window minus the coefficients of the complementary low-pass filter with the same cut-off frequency. That is, the high-pass filter is defined as an all pass-filter (set of coefficients equals a Kronecker delta) minus a low-pass filter with the same cut-off frequency as the desired high-pass filter. This is graphically shown in FIG. 13b), where the left-hand side is the desired frequency response HP of the high-pass filter and the right-hand side is the difference of the responses of an all-pass filter AP and the above described low-pass filter LP. The actual fusion can be done as a superposition of the bands, wherein the LF and HF frequency bands are simply added to each other. As it has become clear from the above description, the low-frequency band of the high-resolution (HRLF) image $L_1$ is obtained in principle by interpolation, while the high-frequency band of the high-resolution (HRHF) image $H_1$ is obtained in principle by extrapolation.

Figure 6:
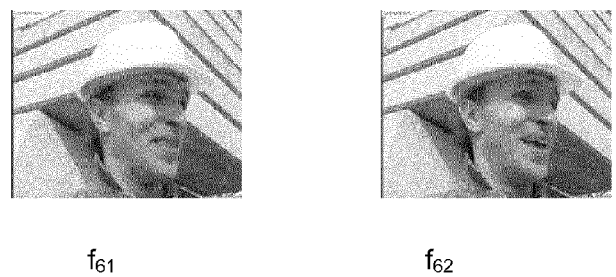
FIG. 6 two exemplary consecutive low-resolution input frames.
Figure 7:
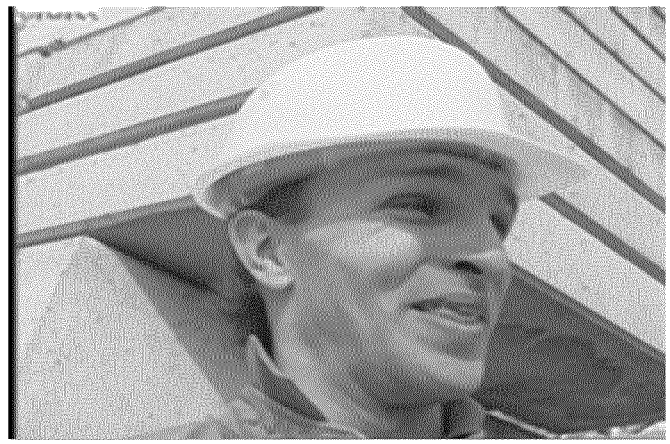
FIG. 7 the corresponding super-resolved output frames.
Figure 7:
Figure 7:

As an example, given two consecutive low-resolution input frames $f_{61}, f_{62}$ shown in FIG. 6, the super-resolved output frames $f_{71}, f_{72}, f_{73}$ (2× spatial and 1× temporal magnification) are shown in FIG. 7. In FIG. 7, the first frame $f_{71}$ is obtained from the first input frame $f_{61}$ with super-resolved spatial dimensions. The second frame $f_{72}$ is a new frame with super-resolved spatial dimensions. The third frame $f_{73}$ is obtained from the second input frame $f_{62}$ with super-resolved spatial dimensions.

The general idea of the invention is in principle also applicable to other technical fields. The motion compensation technique can be useful to determine the motion between two given images and provide input to more precise robust bundle-adjustment algorithms to determine the relative pose between two views. In coding applications, dense multi-view sequences could be decimated by exploiting the fact that intermediate views can be quickly and accurately guessed from two neighbor views. This could also help providing better 3D reconstructions both in space (generating novel views at a given time instant) and time (tracking positions between consecutive time instants).

One advantage of the invention is that it is simpler and therefore cheaper than known optical flow estimation techniques that are capable of producing interpolated video frames with a level of quality similar to the proposed technique. This could then be coupled with a spatial super-resolution algorithm, which in turn would not exploit the richer, redundant available information in video sequences. This invention has the advantage that it handle natural complex motions. Classical reconstruction-based multi-frame super-resolution techniques cannot, in general, handle natural complex motions.

Figure 8:
FIG. 8 artifacts produced by conventional Block Matching vs. the artifact-free result of the present invention.

In the prior art, usually arbitrary prior models are introduced that produce undesirable effects, like removal of texture close to contours or excessive sharpening. Further, when compared to classical block-matching for frame interpolation, the disclosed technique produces correctly interpolated frames in regions with similar patches in a local neighborhood. Exemplarily, FIG. 8 shows (left-hand side) artifacts produced by Block Matching in such regions with similar patches in their local neighborhoods, as compared to (right-hand side) correct handling with considerably less artifacts, as obtained by the disclosed robust iterative block matching. The picture corresponds to a detail of a frame interpolated from its two closest neighbors.

Further advantages are that, when compared to optical flow techniques, it is not necessary to initially build an image-pyramid for large-scale motion estimation, but rather it is possible to work directly on the input image; our resulting optical flow provides integer displacements, rather than floating point displacements as optical flow techniques do; and we do not need to iterate a large amount of times (as would be typical in energy minimization schemes) to obtain our motion estimates.

Figure 5:
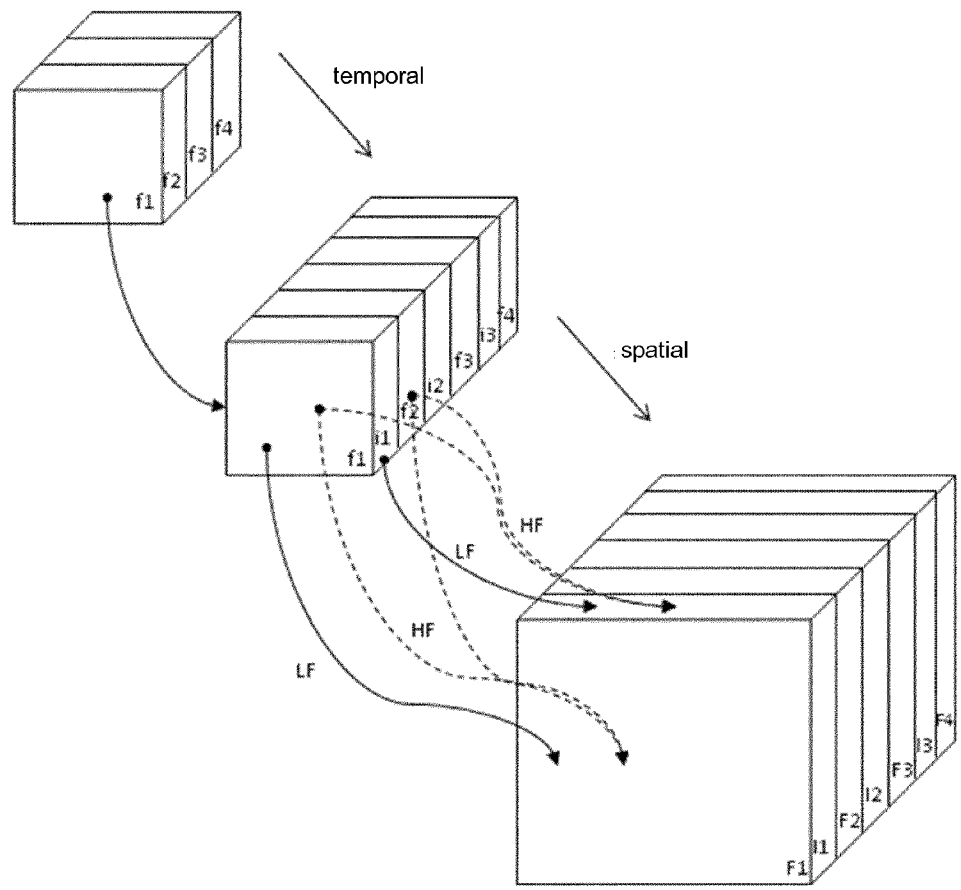
FIG. 5 an overview of how HR/upsampled frames are obtained, in principle.

FIG. 5 shows an overview of how high-resolution upsampled frames are obtained, according to the invention. Low-resolution frames f1, . . . , f4 are first temporally interpolated, as described above, wherein temporally interpolated low-resolution frames i1, . . . , i3 are obtained. Then, high-resolution (HR) frames F1, I1, . . . , I3, F4 are obtained from the low-resolution (LR) frames f1, i1, . . . , i3 by upsampling and interpolation as follows: The low-frequency (LF) portion of the HR frames (HRLF bands) are spatially upsampled from their respective temporally coincident LR frames, which includes temporally interpolated frames. E.g. LF(F1) is upsampled from f1, LF(I1) is upsampled from i1 etc. The high-frequency (HF) portion/bands of the HR frames that have temporally coincident frames in the input sequence, such as F1, . . . , F4, are spatially upsampled from the LR frames of the input sequence, i.e. f1, . . . , f4.

The HF portion/bands of the HR frames that have no temporally coincident frames in the input sequence, such as I1, I2, I3, are spatially upsampled from their neighbor LR frames of the input sequence, i.e. f1, . . . , f4 and then interpolated. E.g. f1 and f2 are upsampled and then interpolated to obtain I1.

In one embodiment, each new HF image I1, . . . , I3 at a non-integer temporal position $\tau$ is temporally interpolated in two separate portions, namely an LF portion and a HF portion. The LF portion is obtained from a temporally interpolated LR image i1 (see FIG. 5), which is then upscaled by spatial super-resolution (with steps as in FIG. 9). The HF portion is obtained from a neighbor frame f1, . . . , f4 that is not temporally interpolated. Also the neighbor frame f1, . . . , f4 is then upscaled by spatial super-resolution (with steps as in FIG. 9). An advantage is that a better matching patch may be found in a neighbor frame.

In one embodiment, the present invention provides a patch-based framework for augmenting the frame-rate of video sequences, and spatially super-resolving each of the output frames. Patch-based (or block-based) image processing has already shown a great performance in problems as diverse as denoising or spatial super-resolution. Here, this adaptability is exploited in order to solve the two mentioned problems in a single patch-based framework. The present invention is suitable for enhancing all types of video sequences, even with a large amount of aliasing in the temporal dimension. I.e. the invention does not focus on sequences with periodic or highly redundant spatial and temporal features only. Temporal sampling frequencies are almost two orders of magnitude lower than those in the spatial dimensions. Advantageously, the spatial super-resolution problem is kept free from priors (which could potentially result in over-fitted image models not adapting well to specific cases). The severely ill-posed temporal super-resolution problem is formulated using a MAP model with linear and non-linear regularizers. In the following, more detail information about the Temporal interpolation is provided.

Temporal interpolation. Considering the video sequence as a volummetric approach, it would be desirable to apply the same interpolation scheme in the three available dimensions (two spatial and one temporal) in order to generate the low-frequency band of the super-resolved video sequence. However, by doing so we would not be able to correctly interpolate temporal events. The temporal domain is, in general, sampled at a frequency below the Nyquist limit, yet sufficient for out visual system to perceive continuous motion in most cases.

In order to improve the temporal resolution even in cases where temporal events are not recurring within the scene, we propose to follow the idea of, first, estimating the motion between consecutive frames and, then, generating intermediate frames at any desired time position by linear interpolation.

In concordance with the framework considered in the rest of our method, we use a patch-based approach with small overlapping patches of dimensions 5×5 pixels. Let $P_{i,j}$ be the set of pixels conforming a patch centered at a pixel in a spatial position (i, j), and $\#P_{i,j}$ the number of elements included in the patch. Let also $u_{i,j}$ ans $v_{i,j}$ be the horizontal and vertical motion components, respectively, at such spatial position. Then, given two consecutive color frames $I_1(x, y)$ and $I_2(x, y)$, and a color distance) $\|I_1(x_1, y_1) - I_2(x_2, y_2)\|_2$, we call use the following variational formulation in order to estimate the motion field:

$$\min_{u,v} \sum_{i,j} \frac{1}{\#P_{i,j}} \sum_{i',j' \in P_{i,j}} \|I_1(i', j') - I_2(i' + u_{i,j}, j' + v_{i,j})\|_2 + \quad (1)$$

$$\lambda_1 \sum_{i,j} \sum_{i',j' \in N^1_{i,j}} |u_{i,j} - u_{i',j'}| + |v_{i,j} - v_{i',j'}| +$$

$$\lambda_2 \sum_{i,j} \sum_{i',j' \in N^2_{i,j}} |u_{i,j} - u_{i',j'}|^2 + |v_{i,j} - v_{i',j'}|^2$$

$N_{i,j}^1$ and $N_{i,j}^2$ are local-scale and large-scale neighborhoods, centered at the position (i, j), and used to reject (impose) variation (constancy) and roughness (smoothness), respectively within their domains. Please note that the proposed data term is not linearized by using the classical optical flow formulation Instead, we are considering a Block Macthing (BM) data term, which uses a larger number of observations than optical-flow and permits us to consider motion estimation schemes not requiring multi-scale processing. The drawback is that the minimization of such a functional is an NP-hard problem.

The first option we consider to tackle this problem is to convexify the data term. The structured data cost around each pixel is substituted by its lower convex hull, represented as a triangle mesh, and projected steepest descent is used with exponentially decreasing update steps cm the data term-convexified functional. After the last iteration, the closest vertex (local minimum) of the lower convex hull is taken as the optimal candidate at each location.

However, we note that this approach is very sensitive to the chosen parameters. If the weight $\lambda_1$ of the first regularization term in Eq. 1 (non-linear) is set to a large value, the update step must be greatly shrinked to reach convergence, resulting in longer running times. Therefore, we consider a further approximation, better suited to the computing capabilities of GPUs, which results in an iterative block matching (Iterative-BM) algorithm that offers a good quality vs. running time trade-off.

Once the motion field has been computed in both directions to $I_1$ to $I_2$ and viceversa), the temporally interpolated frame is obtained as a weighted linear combination of the overlapping displaced patches (with a size of 5×5 pixels) of each image in the direction pointed by the central pixel's motion vector.

In experiments, the initial search window size for BM is set to 41×41 pixels, and is decreased exponentially down to 3×3 pixels during 10 iterations of Iterative-BM. The area of the large-scale linear filter, $\#N_{i,j}^2$ is kept constant during these 10 iterations, with a size of 81×81, whereas the area of the local-scale non-linear filter $\#N_{i,j}^1$, goes from 21×21 pixels down to 3×3 pixels with an exponential decay. The relative variation of the filter areas and search window size in our approximation can be interpreted as a variation of the regularization weights in a coarse-to-fine variational approach (as found in many optical flow estimation techniques). While, initially, the weight of the smoothing filter ($\lambda_2$ in Eq. 1) is slightly larger than that of the data cost term, it experiences an exponential growth (as the BM search window size exponentially decays) during the corresponding optimization. The weight of the edge-preserving filter, $\lambda_2$, varies from being smaller than that of the data-cost term up to being practically equal, corresponding to the exponential decays applied on both BM search window size and filter area with identical dimensions in the last stage. Whereas more accurate tuning of the diverse search window sizes would provide marginal improvements, the used values have sufficed in providing plausible results in our experiments.

An additional biases BM step with a small search window size of 3×3 pixels is used to ensure the matching patches are actual local minima previous to the rendering of the interpolated frame. The latter operation is straightforward to implement on the GPU.

Note that in eq.(1) the second and third summands that are multiplied by $\lambda_1$ and $\lambda_2$ are applied on block level, and not on pixel level (i.e. single pixels). This is a difference e.g. against optical flow methods.

The disclosed algorithm can be considered as a greedy algorithm, i.e. an algorithm that makes the locally optimal choice, instead of generally trying to make overall optimal choices. Greedy algorithms can even provide better solutions than "optimal" methods when it is not possible to apply a sufficient number of iterations for these to converge.

One advantage of the proposed solution is the possibility of obtaining frame-rate up-conversion and spatial up-scaling separately or in a joint manner, with an algorithm suitable to current massively parallel hardware that does not require costly global optimization methods.

As a further advantage, the invention provides a robust block-matching algorithm which can be easily implemented particularly in graphics hardware, since it is designed to fit the hardware available in massively parallel platforms, and which provides frame interpolation with a high level of quality, rivaling that of costly optical flow estimation methods.

As a further advantage, the invention allows integration in a generic framework for super-resolving signals with cross-scale self-similarity, which results in jointly obtaining super-resolved video frames and frame-rate up-conversion. Furthermore, frame-rate up-conversion can be achieved at any desired value. The disclosed method is capable of improving, for example, classical techniques for telecine, like 2:3 pull-down and similar.

Several exemplary embodiments are summarized in the following.

An apparatus for performing super-resolution on a low-resolution input video frame sequence, comprises a spatial interpolation module for spatially interpolating frames of the input video frame sequence, wherein high-resolution, low-frequency spatial and temporal bands are generated; a spatial extrapolation module for performing cross-frame spatial high-frequency extrapolation on video frames of the input data sequence, wherein a high-resolution, high-frequency spatial band is generated; and a fusion module for fusing the high-resolution, low-frequency spatial and temporal bands and the high-resolution, high-frequency spatial band, wherein a spatio-temporally super-resolved video sequence is obtained.

In one embodiment of the cross-frame spatial high-frequency extrapolation, temporally interpolated frames of the low-frequency spatial and temporal bands are used.

In one embodiment, the apparatus further comprises a module for obtaining a temporally interpolated frame of the low-frequency spatial and temporal bands, which comprises a motion field generator module for generating a motion field between at least two input frames; an output image buffer; control unit for determining a temporal position of the output image; a dividing module for dividing each of the two input frames into overlapping patches; a linear interpolator that, for each of the patches of one or both input frames, calculates the patch's spatial position in the output image by linear interpolation of the motion vector according to the determined temporal position; a weighting factor calculator that, for each of the patches of one or both input frames, calculates a weighting factor according to the determined temporal position and multiplies pixel values of a current patch with the weighing factor, wherein weighted pixel values of each patch are obtained; a first accumulator for accumulating, in the output image buffer, the weighted pixel values of the patches at the calculated spatial positions of the respective patches, wherein each patch contributes weighted values of its pixels to pixels of the output image at the calculated position; a weighting factor accumulation buffer; a second accumulator for accumulating, in the weighting factor accumulation buffer, the weighting factors that contribute to each pixel of the output image, wherein an accumulated weighting factor is obtained for each pixel; and a normalizer module that, after all the patches of both images have been processed, normalizes the accumulated intermediate output image by the accumulated weighting factor retrieved from the weighting factor accumulation buffer.

In one embodiment, the apparatus further comprises an IRBM unit, wherein the motion field is obtained by IRBM.

In one embodiment, the fusion module for fusing of the high-resolution, low-frequency (HRLF) spatial and temporal bands and the high-resolution, high-frequency (HRHF) spatial band comprises a high-pass filter 995 for filtering the high-resolution, high-frequency (HRHF) spatial band, wherein a HP-filtered high-resolution, high-frequency (HRHF) spatial band is obtained; and a combiner for adding the HP-filtered high-resolution, high-frequency (HRHF) spatial band and the high-resolution, low-frequency (HRLF) spatial and temporal bands.

In one embodiment, the spatial interpolation module for spatially interpolating the input video frame sequence comprises a first low-pass filter $F_{i,0}$ for filtering input video frames of the input video frame sequence, wherein low-frequency input video frames are obtained; a differentiator 980 for calculating a difference between the input video frames and the low-frequency input video frames, whereby high-frequency input video frames are generated; an upscaler 920 for upscaling the input video frames, and a second low-pass filter $F_{I,1}$ for filtering the upscaled input video frames, wherein low-frequency upscaled video frames are obtained; a processing module for determining in the low-frequency upscaled video frames a first patch at a first position; a search unit 952 for searching in the low-frequency input video frames a first block that matches the first patch ($P_{n,L1}$) best, and determining the position of said first block ($B_{n,L0}$) within the low-frequency input video frames ($L_0$); a selector 955 for selecting a second block ($B_{n,H0}$) in the high-frequency input video frames ($H_0$) at the determined position; an accumulator 957 for accumulating pixel data of the selected second block ($B_{n,H0}$) to a second patch ($P_{n,H1}$), the second patch being a patch in a high-frequency upscaled video frames ($H_{1,acc}$) at the first position; a control unit 950 for controlling one or more of the search unit 952, selector 955 and accumulator 957, wherein all patches in the low-frequency upscaled video frames are processed; a normalizing unit 990 for normalizing the accumulated pixel values in the high-frequency upscaled video frames ($H_{1,acc}$), whereby normalized high-frequency upscaled video frames are obtained; and a combining unit 999 for adding at least one of the normalized high-frequency upscaled video frames to at least one of the low-frequency upscaled video frames, whereby a spatially super-resolved video frame is obtained.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. All images and/or patches mentioned can be, but need not necessarily be, color images and/or color patches. It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections. Reference numerals appearing in the claims are by way of illustration only and shall have no limiting effect on the scope of the claims.

Cited References

[1] *"Space-Time Super-Resolution from a Single Video"*, O. Shahar, A. Faktor and M. Irani, IEEE Conf. on Computer Vision and Pattern Recognition, 2011

[2] *"On improving space-time super resolution using a small set of video inputs"*, U. Mudenagudi, S. Banerjee and P. Kalra, Indian Conf. on Computer Vision, Graphics and Image Processing, 2008

[3] *"Spatio-temporal resolution enhancement of video sequence based in super-resolution reconstruction"*, M. Haseyama, D. Izumi and M. Takizawa, ICASSP 2010

[4] "Super-Resolution Without Explicit Subpixel Motion Estimation", H. Takeda, P. Milanfar, M. Protter and M. Elad, IEEE Trans. on Image Processing, vol. 18, no. 9, 2009

The invention claimed is:

1. A method for performing super-resolution on an input video frame sequence having first spatial and a first temporal resolution, comprising:
  temporally interpolating frames of the input video frame sequence, wherein temporally interpolated frames are obtained;
  spatially interpolating frames of the input video frame sequence and the temporally interpolated frames, wherein spatial and temporal high-resolution, low-frequency frames are generated that have a second spatial resolution being higher than the first spatial resolution and a second temporal resolution being higher than the first temporal resolution;
  performing cross-frame spatial high-frequency extrapolation on video frames of the input sequence, wherein a spatial high-frequency synthesis is applied using patches of the input sequence, and wherein high-resolution, high-frequency spatial frames are generated that have the second spatial resolution and second temporal resolution, wherein a first group of spatial high-resolution high-frequency frames having temporally coincident input video frames are synthesized from their respective temporally coincident input video frame, and wherein a second group of spatial high-resolution high-frequency frames not having a temporally coincident input video frame are synthesized from input video frames that are temporally coincident with adjacent frames that belong to the first group; and fusing the spatial and temporal high-resolution, low-frequency frames and the spatial high-resolution, high-frequency frames, wherein a spatio-temporally super-resolved video sequence is obtained.

2. The method according to claim 1, wherein a temporally interpolated frame of the low-frequency spatial and temporal frames is obtained by:

generating a motion field between at least two input frames;

initializing an output image buffer;

determining a temporal position of the output image;

dividing each of the two input frames into overlapping patches; and for both input frames performing steps of for each of the patches, calculating its spatial position in the output image by linear interpolation of the motion vector according to the determined temporal position;

for each of the patches, calculating a weighting factor according to the determined temporal position and multiplying pixel values of a current patch with the weighing factor, wherein weighted pixel values of each patch are obtained;

accumulating, in the output image buffer, the weighted pixel values of the patches at the calculated spatial positions of the respective patches, wherein each patch contributes weighted values of its pixels to pixels of the output image at the calculated position;

accumulating, in a weighting factor accumulation buffer, the weighting factors that contribute to each pixel of the output image, wherein an accumulated weighting factor is obtained for each pixel; and when all the patches of both images have been processed; and normalizing the accumulated intermediate output image by the accumulated weighting factor retrieved from the weighting factor accumulation buffer.

3. The method according to claim 2, wherein the motion field is obtained by Iterative Robust Block Matching comprising:

finding similar patches by block matching; and iteratively applying large-scale linear filtering and local-scale non-linear filtering to the similar patches.

4. The method according to claim 1, wherein said fusing the spatial and temporal high-resolution, low-frequency frames and the spatial high-resolution, high-frequency frames comprises:

high-pass filtering the spatial high-resolution, high-frequency frame, wherein a high pass-filtered spatial high-resolution, high-frequency frame is obtained; and adding the high pass-filtered spatial high-resolution, high-frequency frame and the spatial and temporal high-resolution, low-frequency frames.

5. The method according to claim 1, wherein the performing cross-frame spatial high-frequency extrapolation on video frames of the input video frame sequence comprises:

filtering input video frames of the input video frame sequence by a first low-pass filter, wherein low-frequency input video frames are obtained;

calculating a difference between the input video frames and the low-frequency input video frames, whereby high-frequency input video frames are generated;

upscaling the input video frames, and filtering the upscaled input video frames by a second low-pass filter, wherein low-frequency upscaled video frames are obtained;

determining in the low-frequency upscaled video frames a first patch at a first position;

searching in the low-frequency input video frames a first block that matches the first patch best, and determining the position of said first block within the low-frequency input video frames;

selecting a second block in the high-frequency input video frames at the determined position;

accumulating pixel data of the selected second block to a second patch, the second patch being a patch in a high-frequency upscaled video frames at the first position;

repeating the determining a new patch in the low-frequency upscaled video frames, searching in the low-frequency input video frames a block that matches the selected patch best, and selecting a corresponding block in the high-frequency input video frames and accumulating pixel data of the selected corresponding block to a patch in the high-frequency upscaled video frames at the position of said new patch;

normalizing the accumulated pixel values in the high-frequency upscaled video frames, whereby normalized high-frequency upscaled video frames are obtained; and adding at least one of the normalized high-frequency upscaled video frames to at least one of the low-frequency upscaled video frames, whereby a spatially super-resolved video frame is obtained.

6. The method according to claim 5, wherein a current frame of the second group of spatial high-resolution, high-frequency frames is obtained by high-frequency synthesis from two frames of the input sequence that are temporally coincident with directly adjacent frames of the current frame.

7. A non-transitory computer readable storage medium having stored thereon executable instructions that when executed on a computer cause the computer to perform the steps of claim 1.

8. A system for performing super-resolution on an input video sequence, comprising a stage where spatial and temporal high-resolution, low-frequency frames of the input video sequence are generated by interpolation;

a stage where high-resolution, high-frequency spatial frames are synthesized by cross-frame spatial high-frequency extrapolation from frames of the input video sequence; and a stage where these two frames are fused to generate frames of a spatio-temporally super-resolved video sequence.

9. An apparatus for performing super-resolution on an input video frame sequence having a first spatial and a first temporal resolution, comprising:

temporal interpolation module for temporally interpolating frames of the input video frame sequence, wherein temporally interpolated frames are obtained;

spatial interpolation module for spatially interpolating frames of the input video frame sequence and the temporally interpolated frames, wherein spatial and temporal high-resolution, low-frequency frames are generated that have a second spatial resolution being higher than the first spatial resolution and a second temporal resolution being higher than the first temporal resolution;

spatial extrapolation module for performing cross-frame spatial high-frequency extrapolation on video frames of the input sequence, wherein a spatial high-frequency synthesis is performed using patches of the input sequence, and wherein spatial high-resolution, high-frequency frames are generated that have the second spatial resolution and second temporal resolution, wherein a first group of spatial high-resolution high-frequency frames having temporally coincident input video frames are synthesized from their respective temporally coincident input video frame, and wherein a second group of spatial high-resolution high-frequency frames not having a temporally coincident input video frame are synthesized from input video frames that are temporally coincident with adjacent frames that belong to the first group; and fusion module for fusing the spatial and temporal high-resolution, low-frequency frames and the spatial high-resolution, high-frequency frame, wherein a spatio-temporally super-resolved video sequence is obtained.

10. The apparatus according to claim 9, further comprising a module for obtaining a temporally interpolated frame of the low-frequency spatial and temporal frames that comprises
a motion field generator module for generating a motion field between at least two input frames;
an output image buffer;
control unit for determining a temporal position of the output image;
dividing module for dividing each of the two input frames into overlapping patches;
a linear interpolator that, for each of the patches of one or both input frames, calculates the patch's spatial position in the output image by linear interpolation of the motion vector according to the determined temporal position;
a weighting factor calculator that, for each of the patches of one or both input frames, calculates a weighting factor according to the determined temporal position and multiplies pixel values of a current patch with the weighing factor, wherein weighted pixel values of each patch are obtained;
a first accumulator for accumulating, in the output image buffer, the weighted pixel values of the patches at the calculated spatial positions of the respective patches, wherein each patch contributes weighted values of its pixels to pixels of the output image at the calculated position;
a weighting factor accumulation buffer;
a second accumulator for accumulating, in the weighting factor accumulation buffer, the weighting factors that contribute to each pixel of the output image, wherein an accumulated weighting factor is obtained for each pixel; and
a normalizer module that, after all the patches of both images have been processed, normalizes the accumulated intermediate output image by the accumulated weighting factor retrieved from the weighting factor accumulation buffer.

11. The apparatus according to claim 10, further comprising an Iterative Robust Block Matching unit having a large-scale linear filter and a local-scale non-linear filter, wherein the motion field is obtained by the Iterative Robust Block Matching unit by finding similar patches to a given patch, and iteratively applying large-scale linear filtering and local-scale non-linear filtering to the similar patches.

12. The apparatus according to claim 9, wherein said fusion module for fusing the spatial and temporal high-resolution, low-frequency frames and the spatial high-resolution, high-frequency frame comprises:
a high-pass filter for filtering the spatial high-resolution, high-frequency frame, wherein a high pass-filtered spatial high-resolution, high-frequency frame is obtained; and
a combiner unit for adding the high pass-filtered spatial high-resolution, high-frequency frame and the spatial and temporal high-resolution, low-frequency frames.

13. The apparatus according to claim 9, wherein the spatial extrapolation module for performing cross-frame spatial high-frequency extrapolation on video frames of the input video frame sequence comprises:
a first low-pass filter for filtering input video frames of the input video frame sequence, wherein low-frequency input video frames are obtained;
differentiator for calculating a difference between the input video frames and the low-frequency input video frames, whereby high-frequency input video frames are generated;
upscaler for upscaling the input video frames, and a second low-pass filter for filtering the upscaled input video frames, wherein low-frequency upscaled video frames are obtained;
processing module for determining in the low-frequency upscaled video frames a first patch at a first position;
search unit for searching in the low-frequency input video frames a first block that matches the first patch best, and determining the position of said first block within the low-frequency input video frames;
selector for selecting a second block in the high-frequency input video frames at the determined position;
accumulator for accumulating pixel data of the selected second block to a second patch, the second patch being a patch in a high-frequency upscaled video frames at the first position;
control unit for controlling one or more of the search unit, selector, accumulator, wherein all patches in the low-frequency upscaled video frames are processed;
a normalizing unit for normalizing the accumulated pixel values in the high-frequency upscaled video frames, whereby normalized high-frequency upscaled video frames are obtained; and
a combining unit for adding at least one of the normalized high-frequency upscaled video frames to at least one of the low-frequency upscaled video frames, whereby a spatially super-resolved video frame is obtained.

14. The apparatus according to claim 13, wherein a current frame of the second group of spatial high-resolution, high-frequency frames is obtained by high-frequency synthesis from two frames of the input sequence that are temporally coincident with directly adjacent frames of the current frame.

* * * * *